M. C. A. LATOUR.
HIGH FREQUENCY ELECTRIC GENERATOR.
APPLICATION FILED AUG. 2, 1917.
1,330,638.
Patented Feb. 10, 1920.
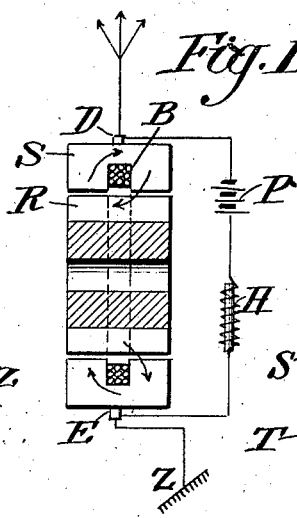
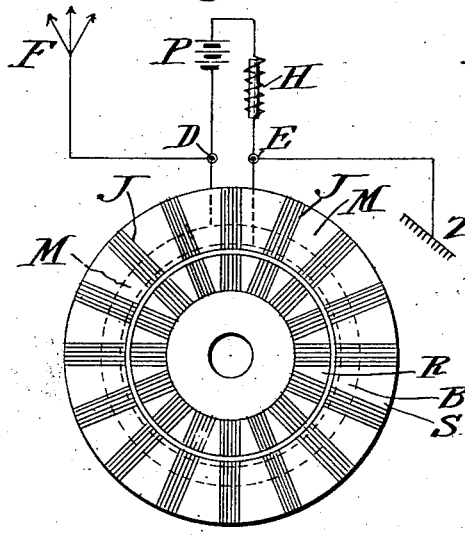
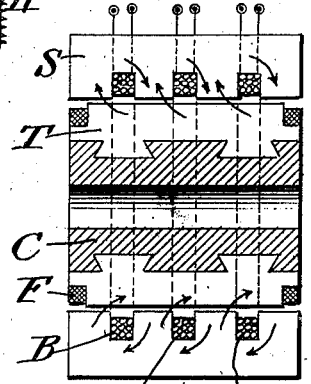
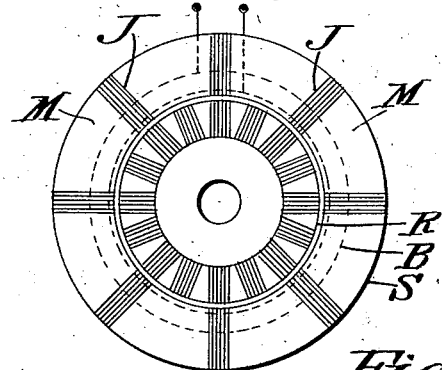
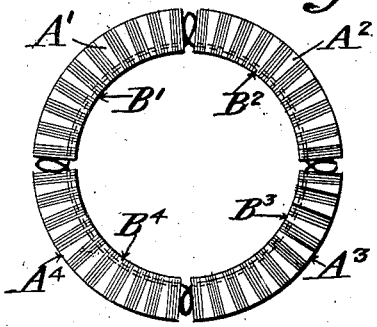
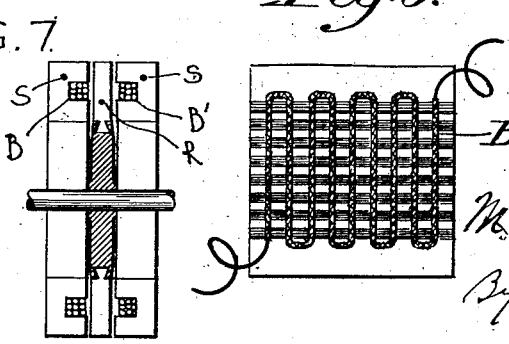
Inventor.
M. C. A. Latour
By Edson Bros.
Attorneys

UNITED STATES PATENT OFFICE.

MARIUS C. A. LATOUR, OF PARIS, FRANCE.

HIGH-FREQUENCY ELECTRIC GENERATOR.

1,330,638.　　　　Specification of Letters Patent.　　Patented Feb. 10, 1920.

Application filed August 2, 1917. Serial No. 184,180.

*To all whom it may concern:*

Be it known that I, MARIUS C. A. LATOUR, a citizen of the Republic of France, residing at 10 Rue Auber, Paris, in the Republic of France, have invented certain new and useful Improvements in High-Frequency Electric Generators, of which the following is a specification.

This invention relates to an improved construction of alternator for the production of alternating currents of high frequency, such alternator being of the variable self induction or reluctance type.

In the construction of high-frequency alternators heretofore suggested it has been found very difficult to insert the windings in the slots by reason of the extremely small dimensions of the poles.

The present invention has for its object the construction of an alternator in which this disadvantage is eliminated, the windings not being lodged in the slots as in the ordinary construction, so that the poles can be made as small, and therefore, as numerous, as is desired. The alternator hereinafter described is analogous to that of a homopolar alternator, but is distinguished therefrom by the fact that the armature preferably comprises a coil such as B, which serves for the excitation; and by the fact that it is laminated throughout its mass; and finally by the fact that the stator comprises a number of teeth generally equal to that of the rotor.

It is to be observed that the losses in the iron are at most equal to those in the fixed part, as the iron of the rotor never changes its polarity, and this constitutes one of the advantages of the new machine.

I will describe with reference to the accompanying drawing a construction in accordance with this invention but I do not limit myself to the precise construction described and illustrated.

Figure 1 of the accompanying drawing is a central diagrammatic section through the axis of the shaft of which only the center line is shown.

Fig. 2 is a view showing the arrangement of the rotor and stator teeth, and intervening non-magnetic material;

Fig. 3 is a sectional view showing a generator having a plurality of slots and coils;

Fig. 4 shows a generator having a rotor having a larger number of teeth than the stator;

Fig. 5 shows a stator having a plurality of sectors;

Fig. 6 shows the winding of a single sector developed;

Fig. 7 shows a plate form of generator.

Referring to Fig. 1, the alternator comprises a central coil B, which is located in a circular recess and whose terminals D and E are respectively connected to antenna F and ground Z, the exciting direct current supply P throwing in coil B through a suitable inductance H, to prevent alternating current passing from D to E. The flux of the coil B is closed across the stator S and the rotor R, following the arrows indicated in the figure. The stator and the rotor are laminated parallel to the shaft. They comprise sets of plates J separated by empty spaces or intervals occupied by a suitable non-magnetic material in such a way that the stator and the rotor comprise, according to a diagrammatic front view, magnetic teeth which are of equal number on the rotor and stator.

The coils of the alternator are connected with an external circuit F Z and with the source of excitation P. In series with this source there is arranged a self-induction coil H provided with magnetic circuits of iron and having a high inductance for the purpose of preventing the high-frequency current going into the battery P.

The phenomenon of induction observed when the rotor revolves is as follows:—

When the teeth of the rotor are opposite those of the stator, the self-induction of the coil B is a maximum. On the other hand when the teeth of the rotor are opposite the empty spaces of the stator, the self-induction of the coil is a minimum.

Hence this is a real variable-reluctance machine, and the electro-motive force induced in the coil B, in consequence of the variation in the reluctance of the magnetic circuit embraced by this coil, constitutes strictly speaking the alternating electromotive force of the machine, the frequency of which is given by the formula $f = mn$, in which $m$ represents the number of teeth and $n$ the number of revolutions. It should be observed that this frequency is double that of an ordinary alternator having the same number of teeth in the stator and rotating at the same speed.

If however an alternator were actually constructed with a single coil, as shown in Fig. 1, one would have in the case considered by the invention of a high-frequency machine, inadmissible losses in the iron, on account of the moderate length of the magnetic circuit, which would be equal to the width of the machine.

In order to diminish this length and thereby to reduce the losses, the conductors are to be distributed over several circular slots and in this way the number of coils concentric with the shaft is multiplied. This is shown in Fig. 3, in which by way of example three concentric coils are shown. These coils may in practice be of any number, and may be connected in series or in parallel.

Similarly, in order to reduce the losses due to the leakage fluxes in the plates J of the teeth of the stator and of the rotor, which losses become very heavy in the case of a high frequency machine, it is necessary to fill up partially or wholly the empty spaces between the teeth of the stator and of the rotor with material M which, while being non-magnetic, is a good electrical conductor such as copper or aluminium. The object of the invention is thus to adapt the type of machine conceived according to the principle represented in Fig. 1 to the production of high-frequency currents.

An alternator may thus be constructed comprising several coils, B, B', B'', as shown in Fig. 3 by way of example, for the case of three coils. These coils, whatever their number can be connected in parallel or in series.

These figures illustrate by way of example the method of mounting a bundle of plates on the rotor. These plates T are attached to a cylinder C by a dovetail arrangement and held strongly on the cylinder by hoops F consisting of steel rings which may be shrunk on. The intervals between bundles of plates may be occupied by blocks of aluminum which may be mounted in the same manner as the bundles of plates.

The number of teeth on the stator and on the rotor need not necessarily be the same. There may be on one of the members a multiple or a sub-multiple of that on the other, the frequency of the machine being determined by the member that has the greater number of teeth as shown by Fig. 4. Finally the empty spaces on the two members might be of any width relative to the width of the teeth, so as to develop whatever harmonic, even or odd, it is desired to obtain.

The empty spaces of the stator and of the rotor may as stated be occupied by a substance which is a good conductor from an electrical point of view, so as to form a screen for the leakage flux.

It is also possible to arrange in these empty spaces, if necessary, active windings for collecting the electro-motive force induced in the machine. The excitation winding and the armature winding may be distinct, although arranged in the same slots or recesses. In the latter case the armature winding would preferably be situated above the excitation winding and in the immediate neighborhood of the air gap.

Like all dynamos having cylindrical armatures, the present machine may be adapted to the disk form. Such a construction is diagrammatically illustrated in Fig. 7, where S S is the stator, B B' the slots containing the armature and field magnet windings, and R the rotor. As indicated above for the type of machine having a cylindrical armature, the stator and the rotor are laminated parallel to the shaft and comprise bundles of plates separated by open spaces or by intervals packed with suitable non-magnetic conducting material.

In a modification the stator preferably comprises a plurality of sectors. In Fig. 5 of the accompanying drawing the stator is illustrated by way of example consisting of four sectors $A_1$, $A_2$, $A_3$ and $A_4$.

Each sector can then be wound separately, and these separate windings $B_1$, $B_2$, $B_3$ and $B_4$ are then connected to one another in the empty spaces left available between the sectors. These spaces may be as large as is necessary for the purpose of establishing the connections.

In Fig. 5 the winding B of a single sector is shown developed. This figure makes it possible to realize that the winding is practical in execution, convenient because it is made on an arc instead of being made over the entire circumference as was indicated in Fig. 2.

It may be observed that the various sectors may be adjusted separately as regards the air gap.

Furthermore, this construction lends itself to the execution of a machine in which the various sectors would each constitute an independent machine, these various machines being connected in cascade for the purpose of obtaining a multiplication of frequency in accordance with the principle indicated in French Patent No. 451430 of the 21st November, 1912, and the addition thereto No. 17253 of the 20th February, 1913.

What I claim and desire to secure by Letters Patent of the United States is:—

1. A high frequency electric generator comprising in combination a stator having the active iron part thereof formed of groups of laminated plates, a rotor also having the active iron part thereof formed of laminated plates arranged in each case parallel to the axis of the stator and non-magnetic material arranged between the groups of plates said material being electrically conductive for the purpose set forth.

2. A high frequency electric generator comprising a stator divided into a plurality of separate sectors, groups of laminated plates in each sector, non-magnetic material having the property of electrical conductivity between each group of plates and a winding on said stator.

3. A high frequency electric generator comprising a stator divided into a plurality of separate sectors, groups of plates assembled in each sector, non magnetic material between each group of plates and a winding supported on the stator.

4. A high frequency electric generator comprising a stator divided into a plurality of separate sectors, groups of laminated plates in each sector, non-magnetic material having the property of electrical conductivity between said group of plates, a coil, the convolutions of said coil being at right angles to the axis of the rotor and wound around the several sectors.

5. A high frequency electric generator comprising a stator divided into a plurality of separate sectors, groups of laminated plates in each sector, non-magnetic material having the property of electrical conductivity between each group of plates, a coil, the convolutions of said coil being at right angles to the axis of the rotor, and connected to form a continuous winding around the several sectors.

6. A variable inductance alternator, for the production of high-frequency currents, wherein the active iron of the stator and of the rotor is formed of laminated plates arranged parallel to the shaft, the field magnet and armature windings being arranged in the form of several coils concentric with the shaft, characterized by the fact that the empty spaces between the teeth of the stator are filled with a metal which is a good electrical conductor in order to form a magnetic screen.

In testimony whereof I affix my signature in presence of two witnesses.

MARIUS C. A. LATOUR.

Witnesses:
EMILE BERTRAND,
CHAS. P. PRESSLY.